(12) United States Patent
Lim et al.

(10) Patent No.: US 11,808,141 B2
(45) Date of Patent: Nov. 7, 2023

(54) SMART WELLHEAD

(71) Applicant: Cameron International Corporation, Houston, TX (US)

(72) Inventors: Haw Keat Lim, Singapore (SG); Yong Wee Lee, Singapore (SG); Sanjay Menon, Singapore (SG); Srivathsan Sudershan Vuruputoor, Singapore (SG)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 208 days.

(21) Appl. No.: 17/418,503

(22) PCT Filed: Dec. 26, 2019

(86) PCT No.: PCT/US2019/068576
§ 371 (c)(1),
(2) Date: Jun. 25, 2021

(87) PCT Pub. No.: WO2020/139944
PCT Pub. Date: Jul. 2, 2020

(65) Prior Publication Data
US 2022/0065100 A1 Mar. 3, 2022

Related U.S. Application Data

(60) Provisional application No. 62/785,224, filed on Dec. 27, 2018.

(51) Int. Cl.
*E21B 47/095* (2012.01)
*E21B 23/02* (2006.01)
(Continued)

(52) U.S. Cl.
CPC ............ *E21B 47/095* (2020.05); *E21B 23/02* (2013.01); *E21B 33/04* (2013.01); *G01S 15/08* (2013.01)

(58) Field of Classification Search
CPC ......... E21B 47/095; E21B 33/04; E21B 23/02
See application file for complete search history.

(56) References Cited

U.S. PATENT DOCUMENTS 6,478,087 B2  11/2002 Allen
6,725,924 B2  4/2004 Davidson et al.
(Continued)

FOREIGN PATENT DOCUMENTS

GB       2488659 B    7/2016
WO   WO-2022133596 A1 *  6/2022

OTHER PUBLICATIONS

International Search Report and Written Opinion issued in the PCT Application PCT/US2019/068576, dated Apr. 24, 2020 (14 pages).
(Continued)

*Primary Examiner* — Jennifer H Gay
(74) *Attorney, Agent, or Firm* — Matthew Goode

(57) ABSTRACT

Smart wellhead assemblies with sensors for detecting positions of components within the bores of the wellhead assemblies are provided. In some instances, the sensors can be used to detect one or more of landing, locking, or concentricity of hangers, packoffs, or other internal wellhead components within bores. In one example, a method of installing a hanger within a wellhead includes lowering the hanger within the wellhead and using one or more sensors to detect when the hanger is at a target location. The method can also include activating a locking mechanism of the hanger and using the one or more sensors to detect when the locking mechanism has secured the hanger within the wellhead. Additional systems, devices, and methods are also disclosed.

8 Claims, 11 Drawing Sheets

(51) Int. Cl.
*E21B 33/04* (2006.01)
*G01S 15/08* (2006.01)

(56) References Cited

U.S. PATENT DOCUMENTS

| | | | |
|---|---|---|---|
| 7,274,989 B2 | 9/2007 | Hopper | |
| 8,826,988 B2* | 9/2014 | Gray | E21B 33/085 |
| | | | 166/344 |
| 9,869,174 B2* | 1/2018 | Szpunar | E21B 47/095 |
| 10,087,745 B2 | 10/2018 | Gottlieb et al. | |
| 10,605,033 B2* | 3/2020 | Levert | E21B 33/04 |
| 2002/0189806 A1* | 12/2002 | Davidson | E21B 41/0014 |
| | | | 166/336 |
| 2007/0039738 A1 | 2/2007 | Fenton et al. | |
| 2008/0008043 A1* | 1/2008 | Jong | E21B 47/017 |
| | | | 367/127 |
| 2009/0139724 A1* | 6/2009 | Gray | E21B 23/04 |
| | | | 166/345 |
| 2011/0083854 A1* | 4/2011 | Jennings | E21B 33/035 |
| | | | 166/348 |
| 2013/0283919 A1* | 10/2013 | Coonrod | G01S 15/08 |
| | | | 73/632 |
| 2014/0014334 A1 | 1/2014 | Mason et al. | |
| 2016/0305232 A1* | 10/2016 | Bird | E21B 47/001 |
| 2016/0319657 A1* | 11/2016 | Szpunar | E21B 47/095 |
| 2017/0362910 A1 | 12/2017 | Stephens et al. | |
| 2018/0163500 A1* | 6/2018 | Levert | E21B 33/0407 |
| 2018/0163520 A1* | 6/2018 | Navar | E21B 47/092 |
| 2019/0169980 A1* | 6/2019 | Gilleland | E21B 33/04 |
| 2021/0095548 A1* | 4/2021 | Navar | E21B 47/095 |
| 2022/0065100 A1* | 3/2022 | Lim | G01S 15/08 |
| 2022/0082015 A1* | 3/2022 | Cain | E21B 47/01 |
| 2022/0243585 A1* | 8/2022 | Hashim | E21B 47/117 |

OTHER PUBLICATIONS

Extended Search Report issued in European Patent Application No. 19903059.4 dated Sep. 16, 2022, 6 pages.

* cited by examiner

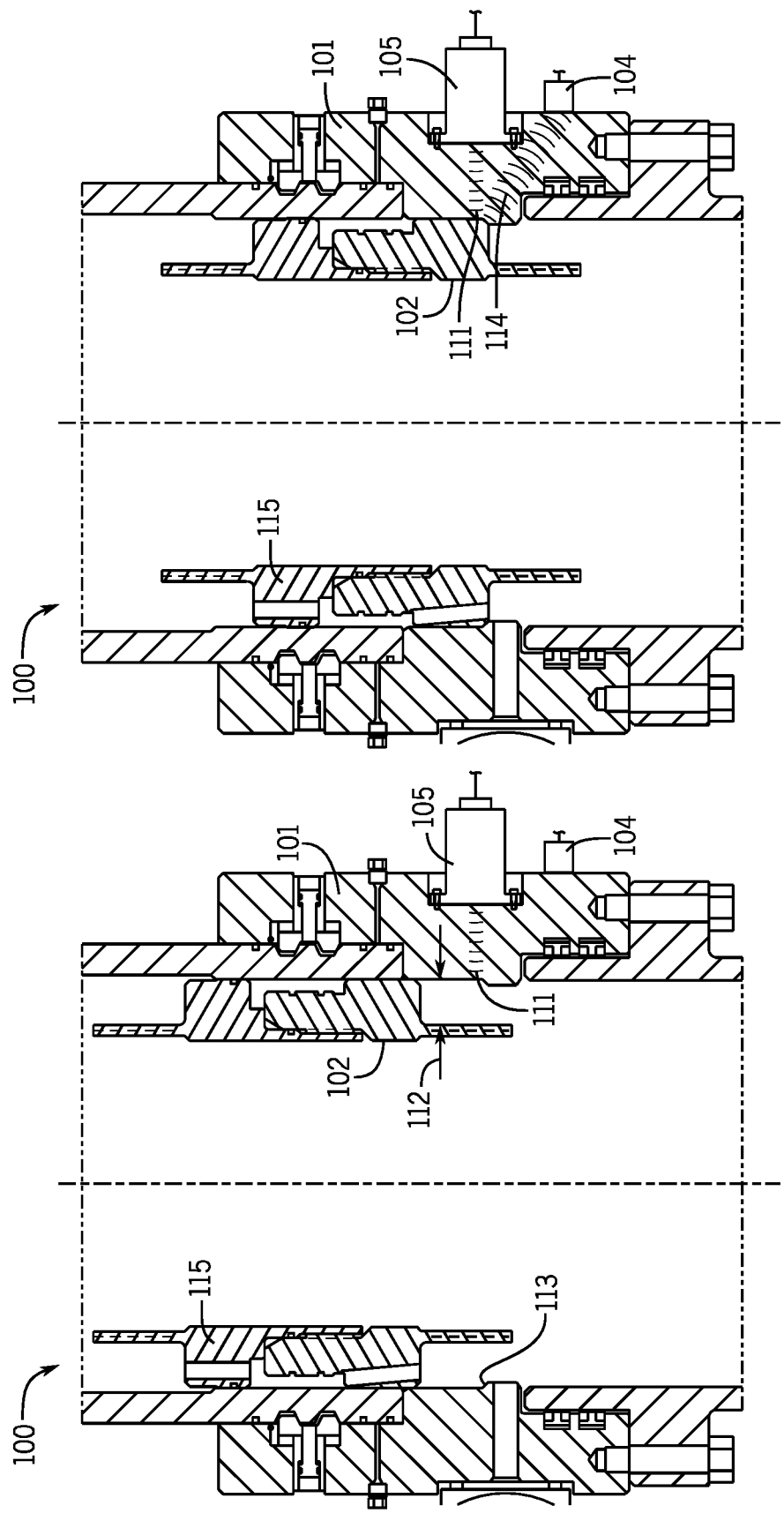

ated December 11, 2007 at 14:54:57 PST (Revision: 7412) - Page 1
SMART WELLHEAD

CROSS REFERENCE PARAGRAPH

This application claims the benefit of U.S. Provisional Application No. 62/785,224, entitled "SMART WELLHEAD," filed Dec. 27, 2018, the disclosure of which is hereby incorporated herein by reference in its entirety.

TECHNICAL FIELD

The present disclosure relates to the installation of equipment, such as casing hangers, in wellheads. More specifically, certain embodiments of the present disclosure relate to identifying the location of equipment within a wellhead.

BACKGROUND

A wellhead assembly, such as that employed for drilling and production operations, will often comprise an apparatus for retaining equipment and assemblies within the wellhead.

For instance, a casing or tubing hanger may be installed within the wellhead such that casings or tubings may be installed in the well suspended from the hanger. The hanger is typically landed within the bore of the wellhead assembly against a shoulder. The hanger assembly typically comprises one or more seals to seal against the inner wall of the wellhead assembly. The hanger assembly may comprise one or more assemblies for engaging with the wellhead, for example with one or more circumferential grooves formed in the inner wall of the wellhead assembly.

To verify landing of the hanger, many existing operations use a manual tally process combined with the manual measurement height at the rig floor. Such practices do not provide for a second verification on the landing shoulder of the wellhead and hanger inside the wellhead bore during landing. Further, the concentricity of the hanger is not able to be verified based on the quantitative process.

To verify lock down operations, many of the existing operations count the number of turns for a lockdown ring to be set and measure the vertical travel distance at the rig floor. The lockdown can then be verified by doing an overpull on the hanger.

SUMMARY

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limiting the scope of the claimed subject matter.

One embodiment of the present disclosure provides a method of installing a hanger at a target location within a wellhead, the hanger having a locking mechanism to secure the hanger within the wellhead, and the wellhead having at least one sensor. The method includes lowering the hanger within the wellhead and using the at least one sensor to detect when the hanger is at the target location. The method can also include activating the locking mechanism and using the at least one sensor to detect when the locking mechanism has secured the hanger within the wellhead.

Another embodiment of the present disclosure provides a method of installing a hanger or a packoff at a target location within a wellhead, the wellhead having at least one ultrasonic sensor. The method includes lowering the hanger or the packoff within the wellhead and using the at least one ultrasonic sensor to detect when the hanger or the packoff is at the target location.

An additional embodiment of the present disclosure provides an apparatus that includes a wellhead assembly having a pressure-containing housing having a bore. The apparatus also includes at least one ultrasonic sensor positioned along the pressure-containing housing outside the bore to detect landing or locking of well equipment within the pressure-containing housing.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and:

FIGS. 3-5 generally depict hanger landing operations within wellhead housings, in accordance with some embodiments;

DETAILED DESCRIPTION

Figure 1:
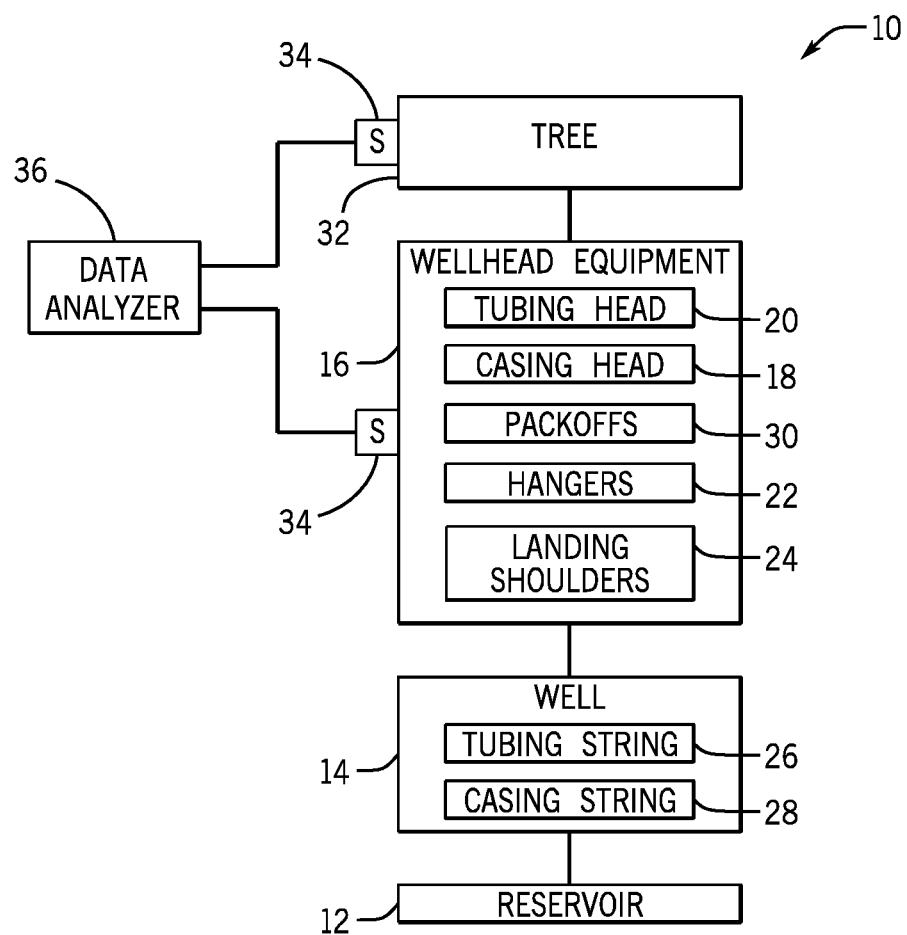
FIG. 1 generally depicts various components, including one or more tubular strings and associated hangers, that can be installed at a well in accordance with one embodiment of the present disclosure.

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for purposes of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for purposes of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements.

In this disclosure, unless the context requires otherwise, throughout the specification and claims which follow, the word "comprise" and variations thereof, such as, "comprises" and "comprising" are to be construed in an open, inclusive sense, that is as "including, but not limited to." Reference to "one implementation" or "an implementation" or to "one embodiment" or "an embodiment" means that a particular feature, structures, or characteristics may be combined in any suitable manner in one or more implementations or one or more embodiments. The singular forms "a," "an," and "the" include plural referents unless the context clearly dictates otherwise. It should also be noted that the term "or" is generally employed in its broadest sense, that is, as meaning "and/or" unless the context clearly dictates otherwise.

The present disclosure describes a digitally enabling wellhead used to verify wellhead operations are done correctly. Such verification can help ensure safety at the wellsite and avoid non-productive time resulting from the need to correct improper installations. As will be described herein, the digitally enabling wellhead of the present disclosure may be used to verify operations through one or more sensors installed on the wellhead. In some embodiments, such a wellhead may provide an improved manner of landing and securing assemblies, such as tubing or casing hangers, within the bore of a wellhead, such that the precise location of the assemblies and the state of the lockdown is known and verifiable. Although the example wellhead operations described herein include hanger landing, concentricity, and lock down verification, it should be understood that the digitally enabling wellhead of the present disclosure is not so limited and may be used for any number of wellhead operations.

Certain embodiments of the digitally enabling wellhead are described herein as using acoustic and ultrasonic sensors. It should, however, be understood that the present disclosure is not so limited. Any sensors able to identify component location, such as proximity sensors, IR sensors, or optical sensors, may be used and remain within the purview of the present disclosure. Additionally, it should be understood that the sensors may be installed on the wellhead prior to the wellhead being sent to the field or the sensors may be assembled to the wellhead in the field location (e.g., by a service technician).

Turning now to the present figures, a system 10 is illustrated in FIG. 1 in accordance with one embodiment. The system 10 includes a wellhead assembly that facilitates extraction of a resource, such as oil, from a reservoir 12 through a well 14. The wellhead assembly includes wellhead equipment 16 installed on the well 14. As depicted, the wellhead equipment 16 includes at least one casing head 18 and tubing head 20, as well as wellhead hangers 22 and landing shoulders 24. But the components of the wellhead equipment 16 can differ between applications, and could include a variety of casing heads, tubing heads, spools, hangers, sealing assemblies (e.g., packoffs 30), stuffing boxes, pumping tees, and pressure gauges, to name only a few possibilities.

The wellhead hangers 22 can be positioned on landing shoulders 24 within hollow pressure-containing housings of the wellhead (e.g., within the tubing and casing heads). These landing shoulders 24 can be integral parts of tubing and casing heads or can be provided by other components, such as sealing assemblies, landing rings, or other hangers 22 disposed in the tubing and casing heads. Each of the hangers 22 can be connected to a tubular string, such as a tubing string 26 or a casing string 28, to suspend the string within the well 14. The well 14 can include a single casing string 28 or include multiple casing strings 28 of different diameters, which may be cemented in place within the well 14. In some embodiments, the wellhead assembly includes a tree 32 (e.g., a production tree) coupled to the wellhead equipment 16. In other instances, wellhead assemblies could also or instead include other components coupled to the wellhead equipment 16, such as blowout preventers, drilling adapters, connecters, or the like.

A bore through the wellhead assembly allows objects, such as a drill string or various tools, to pass into the well 14. Various internal wellhead objects, such as hangers 22, packoffs 30, or locking assemblies, can be lowered into the bore and landed within a pressure-containing housing of the wellhead assembly. The wellhead assembly in FIG. 1 includes sensors 34 for sensing the position of internal wellhead objects within the bore of the wellhead assembly, as discussed in greater detail below. The sensors 34 are shown coupled to the wellhead equipment 16 and the tree 34 in FIG. 1 but could also or instead be positioned elsewhere (e.g., on drilling adapters or blowout preventers). The sensors 34 can take any suitable form, which may include one or more of ultrasonic sensors, acoustic sensors, proximity sensors, magnetic sensors, or optical sensors, and in some instances the sensors 34 may include combinations of multiple sensor types (e.g., ultrasonic and acoustic sensors). Any suitable controllers may be used to control operation of the sensors 34.

A data analyzer 36 may receive and process data or other signals from the sensors 34, such as to determine the position of an internal wellhead object within the bore. In at least some embodiments, the data analyzer 36 is a processor-based system (e.g., a computer). The sensors 34 may communicate with the data analyzer 36 through wired or wireless interfaces. The data analyzer 36 could be positioned near the wellhead assembly or at a remote location. In some embodiments, the data analyzer 36 may be a distributed system with some portion located near the wellhead assembly (e.g., for data collection and initial processing) and another portion located remotely (e.g., for additional processing or data aggregation).

Figure 2:
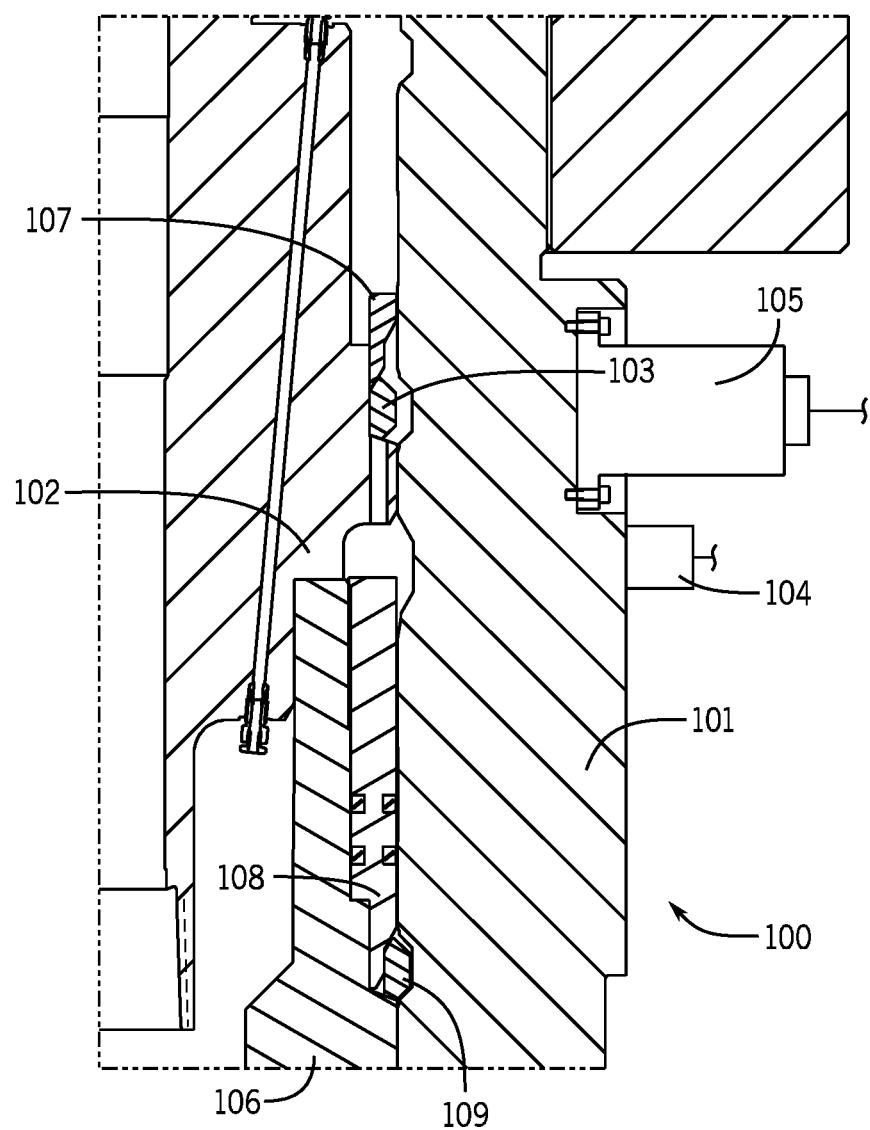
FIG. 2 illustrates an embodiment of a digitally enabling wellhead with a hanger for installation within, in accordance with one embodiment.

An embodiment of the digitally enabling wellhead, referred to generally as 100, is illustrated in FIG. 2. A hanger 102 is shown ready for installation within a pressure-containing housing 101 of the wellhead 100. The illustrated hanger 102 (e.g., a tubing hanger) comprises a lockdown mechanism, including a lockdown ring 103 and an actuator 107, for securing the hanger 102 within the housing 101 once it is landed. It should be understood, however, that depending on the application and the type of hanger, other mechanisms for securing the hanger 102 within the housing 101 may be used and remain within the scope of the present disclosure. The hanger 102 can be landed on any suitable surface. In FIG. 2, the hanger 102 is shown landed on another hanger 106 (e.g., a casing hanger), which is locked in place by lockdown ring 109, with a sealing packoff 108 between the hanger 106 and the inner wall (i.e., bore wall) of the housing 101.

The digitally enabling wellhead 100 comprises one or more sensors. In the embodiment shown in FIG. 2, the wellhead 100 comprises one or more acoustic sensors 104 and one or more ultrasonic sensors 105. However, as discussed above, other sensors capable of identifying the location of components may be used by other embodiments of the present disclosure. Additionally, some embodiments of the present disclosure may use only one set of sensors or may use more than the two sets of sensors depicted in FIG. 2. The number and type of sensors is based on the intended application and intended operation or operations being monitored.

FIGS. 3 and 4 illustrate an embodiment of the digitally enabling wellhead 100 used to identify the landing position of a hanger 102 at a target location within the wellhead. More specifically, these generally depict a hanger landing operation in which the hanger 102 is lowered within the wellhead 100 (FIG. 3) and then landed on a landing shoulder 113 (FIG. 4) in the bore of the housing 101. The hanger 102 can be lowered into the bore with a running tool 115. The one or more acoustic sensors 104 are able to detect the acoustic signature of the hanger 102 (e.g., to detect the sound made by landing the hanger 102 on landing shoulder 113, as represented by sound waves 114 in FIG. 4) to indicate that the hanger 102 is in the process of landing. Additionally, the ultrasonic sensor 105 can take measurements to indicate that the hanger 102 has properly landed within the housing 101 at the target position.

The ultrasonic sensor 105 is positioned to emit ultrasonic waves (shown here generally as a beam 111 of ultrasonic waves) into the bore of the wellhead assembly and can be used to detect landing of the hanger 102 on the landing shoulder 113. The ultrasonic sensor may emit wave pulses or continuous waves. In one embodiment, the ultrasonic sensor 105 emits ultrasonic waves that are at least partially reflected from objects (e.g., the hanger 102) in their path. In some embodiments, the ultrasonic sensor 105 is operated in a reflection mode (e.g., a pulse-echo mode) and both emits the ultrasonic waves into the bore and receives reflections of those waves from various material boundaries encountered by the waves, such as the outer surface of the housing 101, the inner surface of the housing 101, and the outer surface of the hanger 102. It will be appreciated that the ultrasonic sensor 105 can be used to sense an ultrasonic signature of an observed region based on the time-of-flight, intensity, or other characteristics of the reflected ultrasonic waves received by the ultrasonic sensor 105, and that these characteristics will depend on distances traveled and materials encountered by the ultrasonic waves.

In some embodiments, the ultrasonic sensor 105 can be used to measure a distance between the ultrasonic sensor 105 and the hanger 102 (e.g., the total distance between the ultrasonic sensor 105 and the hanger 102 or a distance across gap 112 between the hanger 102 and the bore wall of the housing 101) based on the emission, reflection, and sensing of the ultrasonic waves. When the hanger 102 is positioned as shown in FIG. 3, the gap 112 between the outer surface of the lower end of the hanger 102 is sensed using the ultrasonic sensor 105 and indicates that the hanger 102 has not landed on the shoulder 113. As depicted in FIG. 4, however, once landed on the shoulder 113, a wider portion of the hanger 102 is positioned in front of the ultrasonic beam 111 and reflects ultrasonic waves back to the ultrasonic sensor 105. The ultrasonic waves reflected from the outer surface of the hanger 102 in FIG. 4 arrive at the sensor 105 faster than the ultrasonic waves that were reflected from the lower, narrower end of the hanger 102 toward which the beam 111 is emitted in FIG. 3. This difference may be sensed and used to identify the location of the hanger 102 within the bore. One or more ultrasonic sensors 105 may also or instead be used to identify the location of some other object within the bore, such as a packoff or a running tool.

As shown in FIGS. 3 and 4, the ultrasonic sensor 105 is positioned at an axial location along the housing 101 to emit the beam 111 of ultrasonic waves toward the landing shoulder 113 in a plane perpendicular to the axis of the housing 101 (e.g., with the beam 111 emitted radially inward into the bore). In this arrangement, the presence of the hanger 102 on the shoulder 113 causes a detectable difference in the ultrasonic signature sensed by the ultrasonic sensor 105 (e.g., in the timing of the receipt of ultrasonic waves received by the sensor 105) and allows detection of the landing of the hanger 102 on the shoulder 113. But the one or more ultrasonic sensors 105 can be positioned elsewhere in other embodiments. Additionally, while the ultrasonic sensor 105 depicted in FIGS. 3 and 4 can be used in a reflection mode to both send ultrasonic waves and receive reflections of those ultrasonic waves, in other instances multiple ultrasonic sensors 105 could be used in a pitch-catch mode in which one sensor 105 emits ultrasonic waves and another sensor 105 receives those ultrasonic waves. Any suitable ultrasonic transducers may be used in the sensors 105, such as single-element, dual-element, annular, linear, or phased-array transducers emitting at any suitable ultrasonic frequency.

Figure 5:
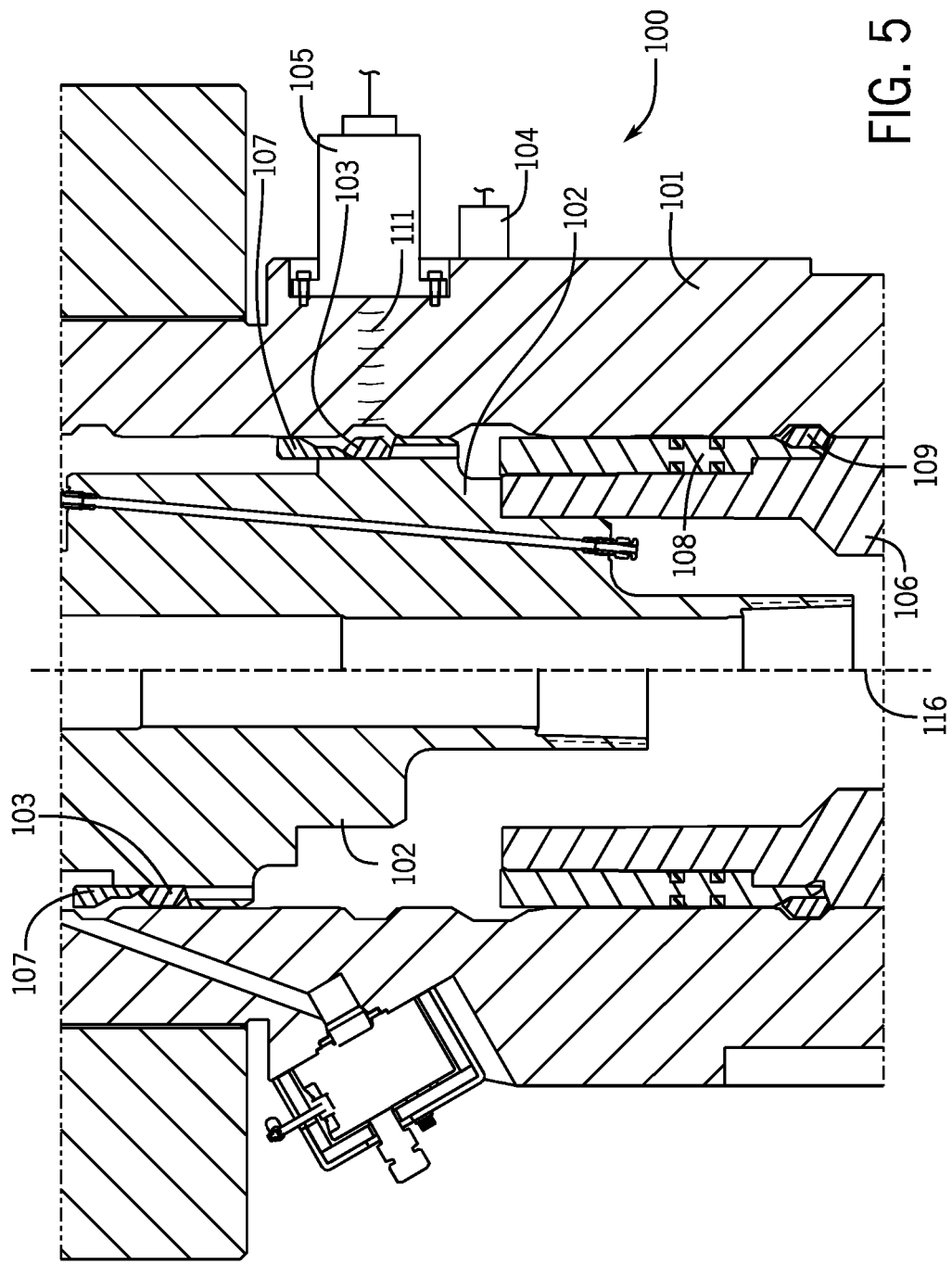

Another example of a hanger landing operation in a wellhead 100 is depicted in FIG. 5. In this embodiment, a hanger 102 is lowered into and landed in a bore of the housing 101. The left side of FIG. 5 (to the left of dashed vertical line 116) shows the hanger 102 being lowered into the bore, while the right side shows the hanger 102 landed within the bore (i.e., on an upper end of another hanger 106). Various sensors 104 or 105 can be used to detect landing of the hanger 102, such as described above. But the ultrasonic sensor 105 shown in FIG. 5 is positioned to detect when a lockdown mechanism has secured the hanger 102 within the wellhead 100, as discussed in more detail below with respect to FIGS. 8-10.

Figure 6:
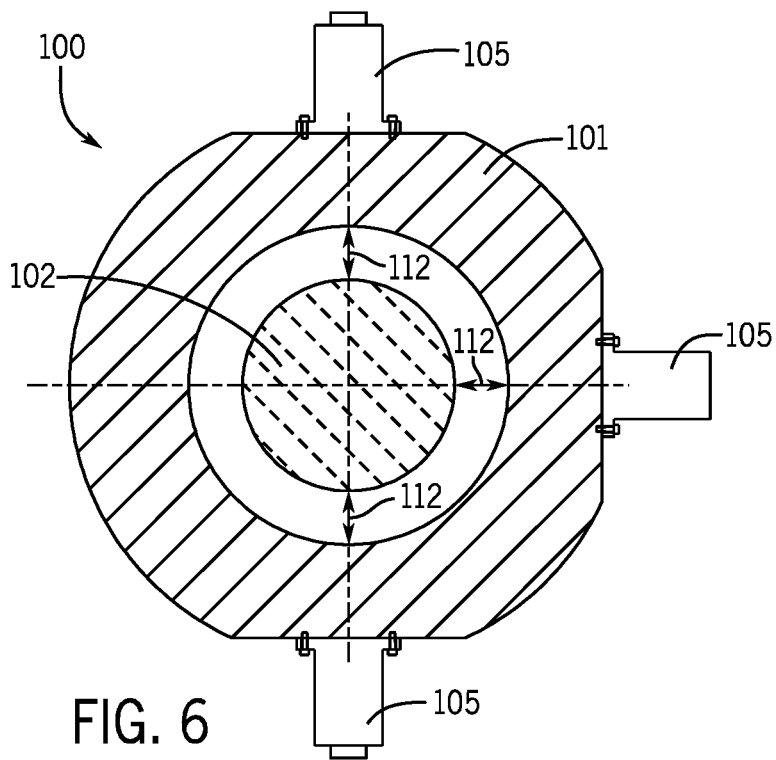
FIGS. 6 and 7 illustrate embodiments of the present disclosure wherein the digitally enabling wellhead includes sensors mounted to exterior surfaces of the wellhead.
Figure 7:
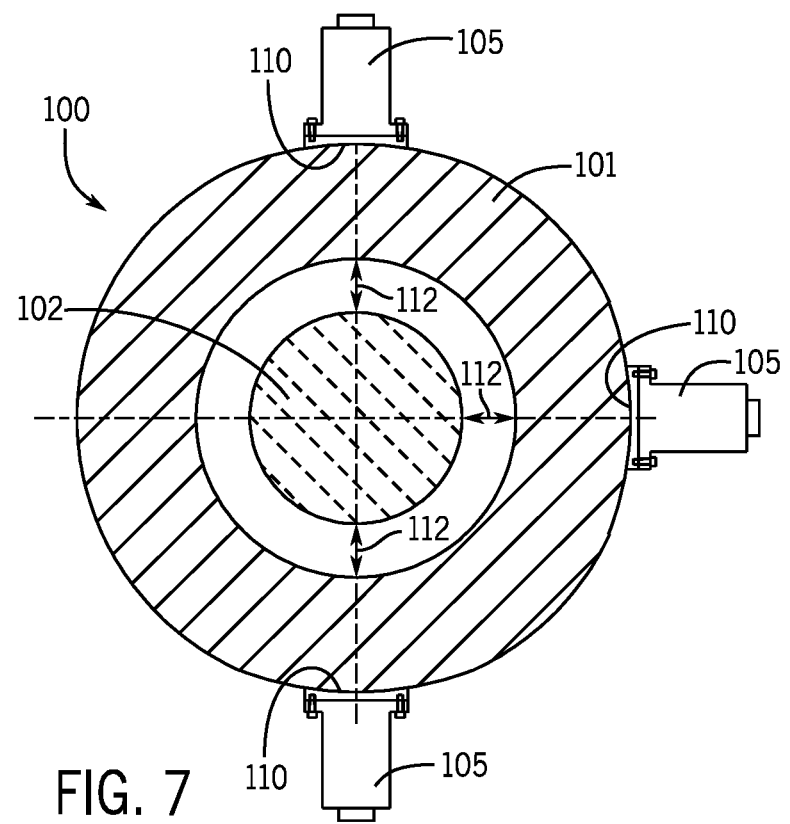

FIGS. 6 and 7 illustrate wellheads 100 having sensors 105 coupled to exterior surfaces of housings 101 in accordance with some embodiments. In these depicted embodiments, there are three ultrasonic sensors 105 but it should be understood that the present disclosure is not so limited. Any number of ultrasonic sensors 105 may be used and remain within the purview of the present disclosure. In FIG. 6, the ultrasonic sensors 105 are shown mounted on flat sides of the exterior surface of the housing 101. In contrast, in FIG. 7 the ultrasonic sensors 105 include curved contact surfaces 110 that mate with curved outward-facing surfaces of the housing 101. While the mating curved surfaces may take different forms, in at least some embodiments the curved contact surfaces 110 are concave surfaces and the curved outward-facing surfaces of the housing are convex. The contact surfaces 110 can be provided on sensor windows or connection adapters of the sensors 105.

In some embodiments, the digitally enabling wellhead 100 takes concentricity measurements within the housing 101 to verify that the hanger 102 has been landed concentric with the central bore of the housing 101. In the axial partial section views of FIGS. 6 and 7, the hanger 102 is shown schematically as being within the bore of the housing 101. The ultrasonic sensors 105 can be used to take measurements inside the housing 101 to verify the position of the hanger 102 between the respective sensors 105. Such measurements are used to verify whether the hanger 102 is positioned concentrically within the housing 101. Respective gaps 112 between the hanger 102 and the bore wall are sensed and any differences between the widths of the gaps 112 (e.g., which may be detected by different ultrasonic signatures or measured distances) can be used to determine concentricity of the hanger 102 within the bore.

Figure 9:
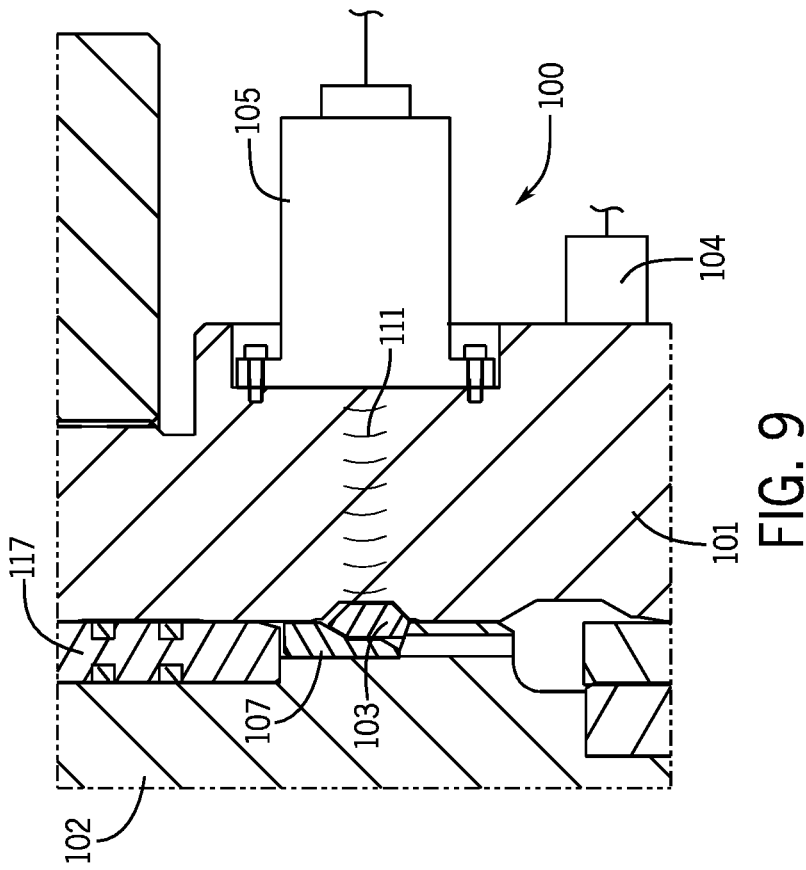
FIGS. 8-10 generally depict hanger locking operations within wellhead housings in accordance with one embodiment.
Figure 8:
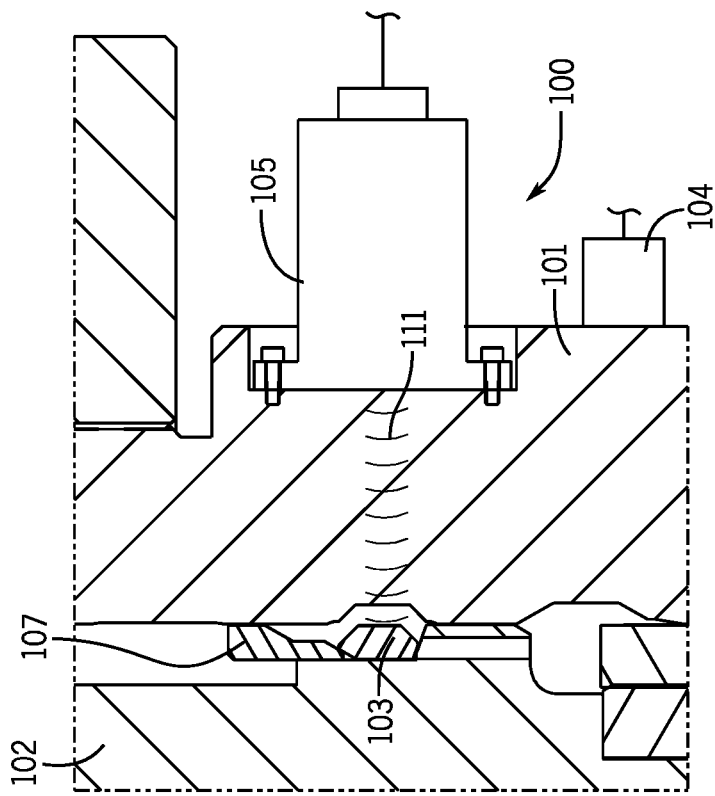
Figure 10:
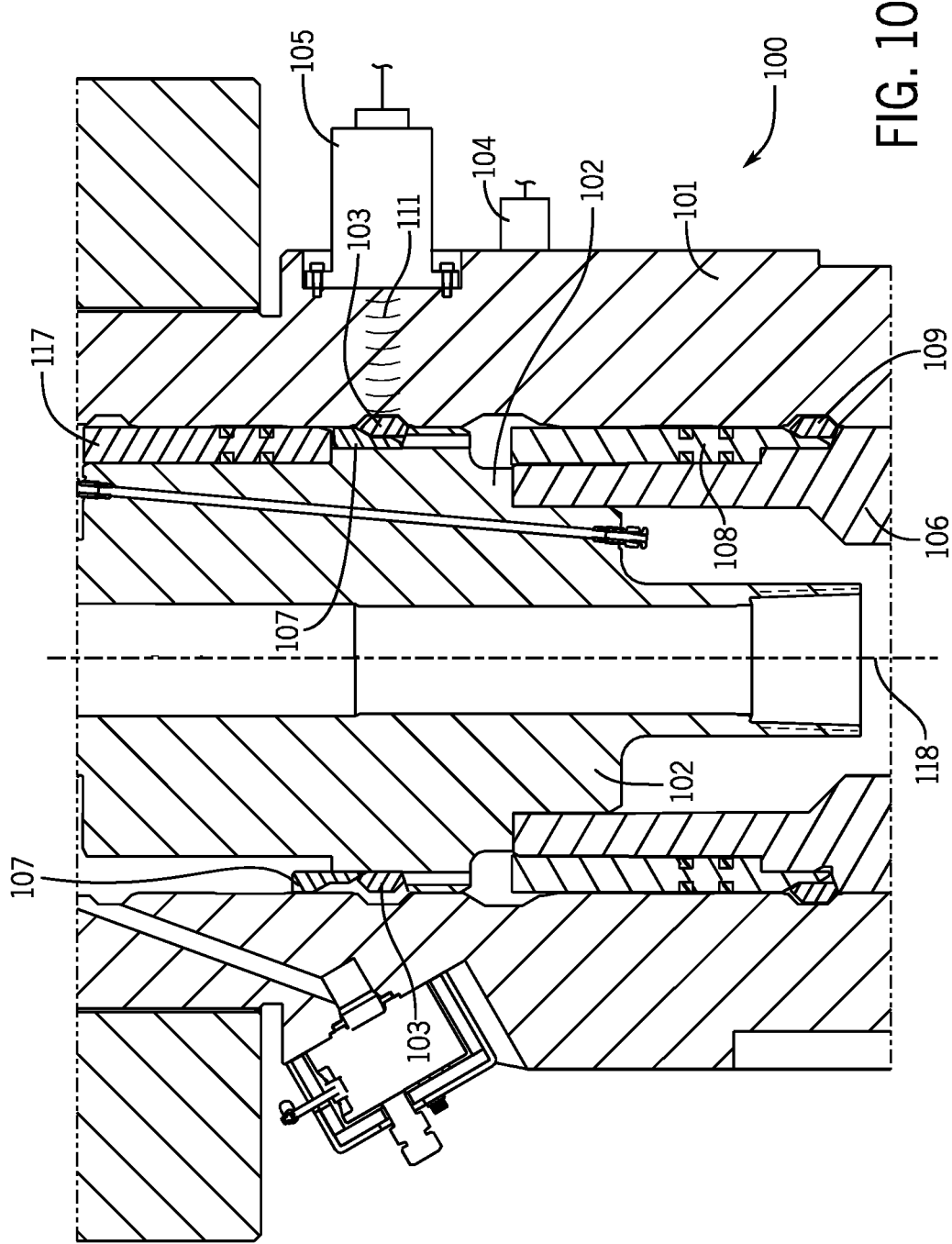

FIGS. 8-10 illustrate an embodiment of the digitally enabling wellhead 100 used to identify that the hanger 102 has been properly locked down once landed in the housing 101. FIGS. 8 and 9 are detail views of the hanger 102 and a lockdown mechanism within the housing 101 and show a lockdown ring 103 in an unlocked position (FIG. 8) and in a locked position (FIG. 9). FIG. 10 is a wider view of the hanger 102 and the lockdown mechanism within the housing 101, in which the lockdown ring 103 is shown unlocked on the left side of FIG. 10 (to the left of dashed vertical line 118) and locked on the right side. When the hanger 102 is landed within the bore, the locking mechanism can be activated by moving the actuator 107 downward to drive the lockdown ring 103 (e.g., an inwardly-biased C-ring) radially outward into a mating recess in the housing 101 (e.g., in the bore wall). A packoff 117 may be installed to seal the annular space above the actuator 107 between the hanger 102 and the bore wall. While the hanger 102 has a lockdown ring 103 for securing the hanger 102 within the housing 101 in this depicted embodiment, alternate locking mechanisms may be used and sensed by the digitally enabling wellhead 100 of the present disclosure.

As shown in FIGS. 8 and 9, the one or more ultrasonic sensors 105 can be used to detect the position of the lockdown ring 103 within the housing 101. Thus, once the hanger 102 has been landed and the lockdown ring 103 has been actuated or otherwise moved into the locked position, the one or more ultrasonic sensors 105 can be used to verify that the hanger 102 has been properly locked down. For instance, the ultrasonic sensor 105 depicted in FIGS. 8 and 9 is axially arranged along the housing 101 to emit ultrasonic waves toward (e.g., radially inward to) the lockdown ring 103. As discussed above, the ultrasonic sensor 105 can take any suitable form and can operate in any suitable manner. In at least some embodiments, the ultrasonic sensor 105 operates in a reflection mode, emitting a beam 111 of ultrasonic waves toward the lockdown ring 103 and receiving reflections (echoes) of the ultrasonic waves from the lockdown ring 103. From the description above, it will also be appreciated that the ultrasonic signature or distance measured by the sensor 105 depends on the distance between the sensor 105 emitting the ultrasonic waves and the lockdown ring 103 reflecting the ultrasonic waves. Consequently, the relative positions of the lockdown ring 103 in unlocked and locked positions can be determined and movement of the lockdown ring 103 radially outward from the unlocked position to the locked position can be detected with one or more sensors 105.

Figure 11:
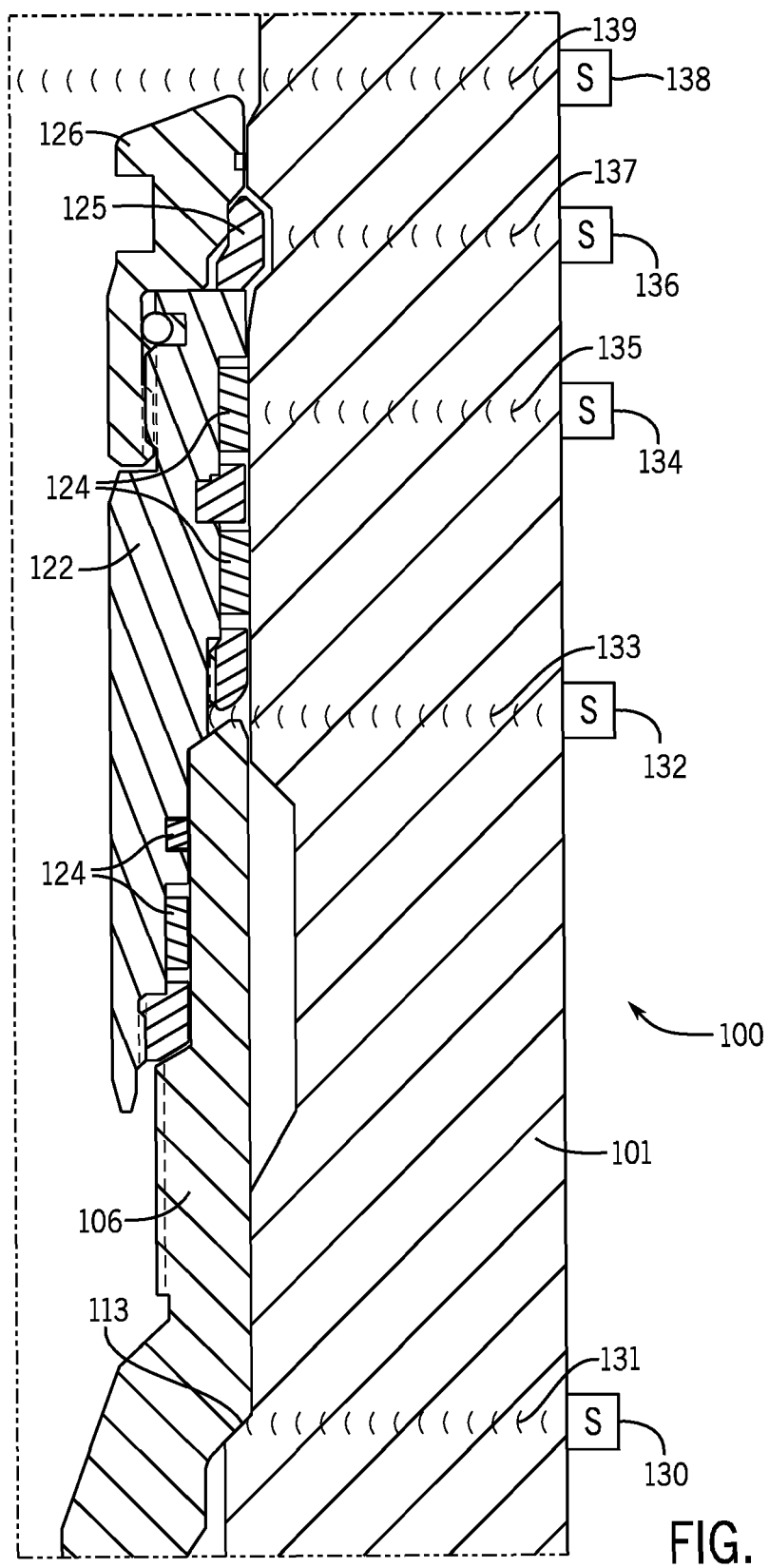
FIGS. 11 and 12 generally depict the use of sensors for detecting positions of internal components within a wellhead assembly in accordance with some embodiments.
Figure 12:
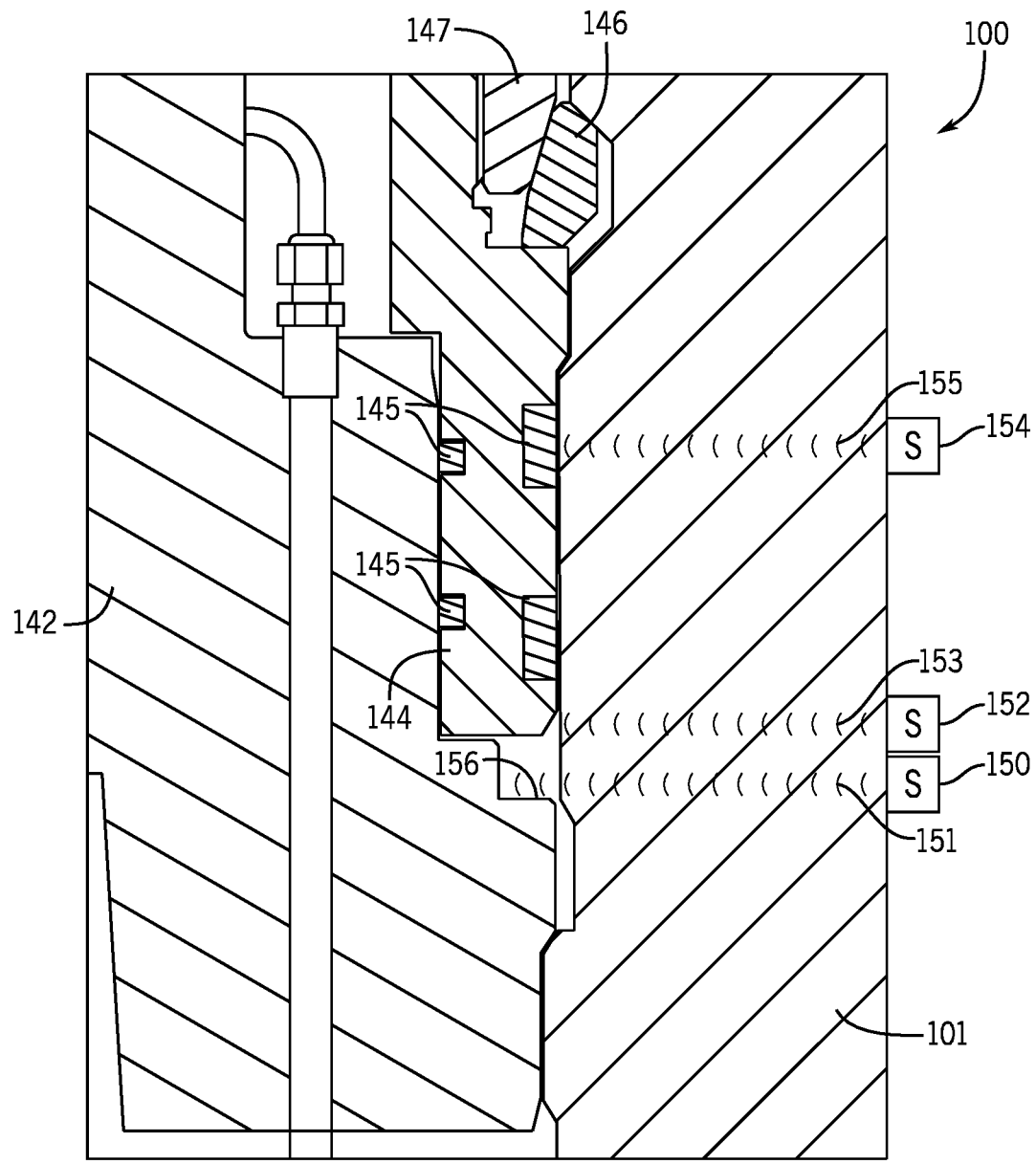

By way of further example, FIGS. 11 and 12 generally depict sensors for detecting positions of internal components within a wellhead assembly. In FIG. 11, a hanger 106 is shown landed on a landing shoulder 113 in a bore of housing 101 of the wellhead 100. A packoff 122 with various seals 124 is installed in the bore above the hanger 106. The packoff 122 includes a lockdown mechanism with a lockdown ring 125 and an actuator 126. The lockdown ring 125 is shown held by the actuator 126 in a locked position in a corresponding recess of the bore wall of the housing 101, but the actuator 126 could be raised to allow the lockdown ring 125 to radially contract to an unlocked position. The depicted wellhead 100 includes various sensors to detect positions of internal components within the bore of the housing 101. Although the sensors could take any other suitable form, the sensors are ultrasonic sensors in some embodiments.

More specifically, in FIG. 11 an ultrasonic sensor 130 is aligned with the landing shoulder 113 and emits a beam 131 of ultrasonic waves into the bore across the landing shoulder. The ultrasonic sensor 130 and beam 131 may be used to detect landing of the hanger 106 on the shoulder 113, such as described above. An ultrasonic sensor 132 is generally aligned with the target location of the upper end of the hanger 106 and emits a beam 133 of ultrasonic waves into the bore at an axial location above the top of the hanger 106 when the hanger 106 is properly landed on the shoulder 113. Whereas the sensor 130 may be used to detect landing of the hanger 106 by detecting a decrease in the distance between the bore wall and the hanger 106 that occurs upon landing, the sensor 132 detects passage of an edge of the hanger 102 (in this case, the upper end of the hanger 102) out of the path of the beam 133. That is, ultrasonic waves of beam 133 that had been reflected by the side of the hanger 102 as it passed through the beam 133 are no longer reflected by the hanger 102 once the hanger 102 is lowered below the path of the beam 133. In at least one embodiment, the ultrasonic sensors 130 and 132 may be used to independently detect landing of the hanger 106 on the shoulder 113.

Additionally, an ultrasonic sensor 134 is shown in FIG. 11 positioned to emit a beam 135 of ultrasonic waves into a seal 124 of the packoff 122 when the packoff 122 is positioned at a desired location within the bore. The seal 124 can be made of a different material (e.g., elastomer) than the body of the packoff 122. This impacts the ultrasonic signature based on the reflected waves sensed by the sensor 134 and may allow the sensor 134 to be used to detect that the seal 124 is positioned at a target location within the bore. An ultrasonic sensor 136 is positioned to emit a beam 137 of ultrasonic waves toward the lockdown ring 125 and may be used to determine whether the lockdown ring 125 is locked or unlocked, such as described above. An ultrasonic sensor 138 is generally aligned with a target location of the upper end of the packoff 122 and emits a beam 139 of ultrasonic waves into the bore above the top of the actuator 126. The ultrasonic sensor 138 could be used to detect landing of the packoff 122 in some instances, like described above for sensor 132. But in some embodiments, the ultrasonic sensor 138 is positioned to emit the beam 139 above the top of the actuator 126 once the actuator 126 is moved downward to a position that moves the lockdown ring 125 into its locked position. In this case, the sensor 138 can be used to detect that the hanger 106 and packoff 122 are locked in place based on detection that the actuator 126 has passed through the beam 139.

In FIG. 12, a tubing hanger 142 is shown landed on a shoulder in the bore of a wellhead housing 101. A packoff 144 with seals 145 is installed in an annular space between the hanger 142 and the bore wall and can be locked in place with a lockdown ring 146 and actuator 147. An ultrasonic sensor 150 is positioned to emit a beam 151 of ultrasonic waves toward the hanger 142. More specifically, the sensor 150 is aligned so as to sense passage of an edge 156 of the hanger 142 out of the beam 151, allowing detection of landing of the hanger 142 on the shoulder in a manner similar to that described above for ultrasonic sensor 132. An ultrasonic sensor 152 is positioned to emit a beam 153 of ultrasonic waves toward the bottom end of the packoff 144 and may be used to detect presence of the packoff 144 at a target location. And like sensor 134, an ultrasonic sensor 154 may be positioned to emit a beam 155 of ultrasonic waves to detect the presence of a seal 145 at a target location in the bore. In still further embodiments, an ultrasonic sensor can be provided along a drilling adapter of the wellhead assembly to detect a groove or other surface of a running tool or landing string. In some instances, the groove or other surface is located (with respect to a hanger or packoff) such that the groove or other surface passes into or out of an ultrasonic beam from the sensor upon landing of the hanger or packoff at a target location within the bore. This allows the sensor along the drilling adapter to be used to detect landing of the hanger or packoff lowered into the bore via the running tool or landing string.

Figure 13:
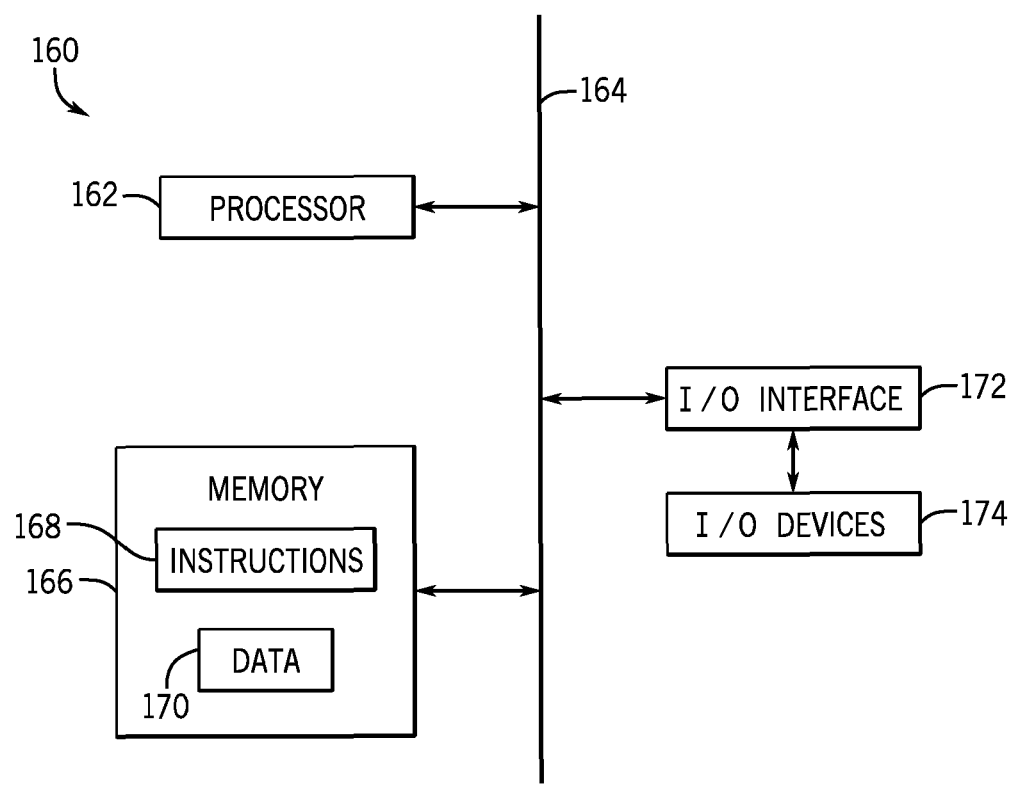
FIG. 13 is a block diagram of a programmable data analyzer that can be used to detect positions of internal components within a wellhead assembly housing in accordance with one embodiment.

It is noted that a data analyzer 36 for implementing various functionality described above can be provided in any suitable form. In at least some embodiments, such a data analyzer 36 is provided in the form of a processor-based system, an example of which is generally depicted in FIG. 13 and denoted by reference numeral 160. In this depicted embodiment, the system 160 includes a processor 162 connected by a bus 164 to a memory device 166. It will be appreciated that the system 160 could also include multiple processors or memory devices, and that such memory devices can include volatile memory (e.g., random-access memory) or non-volatile memory (e.g., flash memory and a read-only memory). The one or more memory devices 166 are encoded with application instructions 168 (e.g., software executable by the processor 162 to perform various functionality described above), as well as with data 170 (e.g., locations sensed by given sensors, geometries of components of wellhead 100, and reference acoustic and ultrasonic signatures to which sensed signatures can be compared). For example, the application instructions 168 can be executed to process data representative of ultrasonic or acoustic waves received by the sensors to determine whether an internal wellhead object has landed in the bore or whether a lockdown mechanism has been activated. In one embodiment, the application instructions 168 are stored in a read-only memory and the data 170 is stored in a writeable non-volatile memory (e.g., a flash memory).

The system 160 also includes an interface 172 that enables communication between the processor 162 and various input or output devices 174. The interface 172 can include any suitable device that enables such communication, such as a modem or a serial port. The input and output devices 174 can include any number of suitable devices. For example, in one embodiment the devices 174 include one or more sensors, such as those described above, for providing input to be used by the system 160 to detect landing, locking, concentricity, material, or other characteristics of objects in the bore. The devices 174 may also include a keyboard or other interface that allows user-input to the system 160, and a display, printer, or speaker to output information from the system 160 to a user, such as a visual or audio indication that a hanger, packoff, or other object has landed or is locked within the wellhead 100. In some embodiments, the devices 174 include a computer or handheld device that can be used by a service technician near the wellhead 100.

Figure 14:
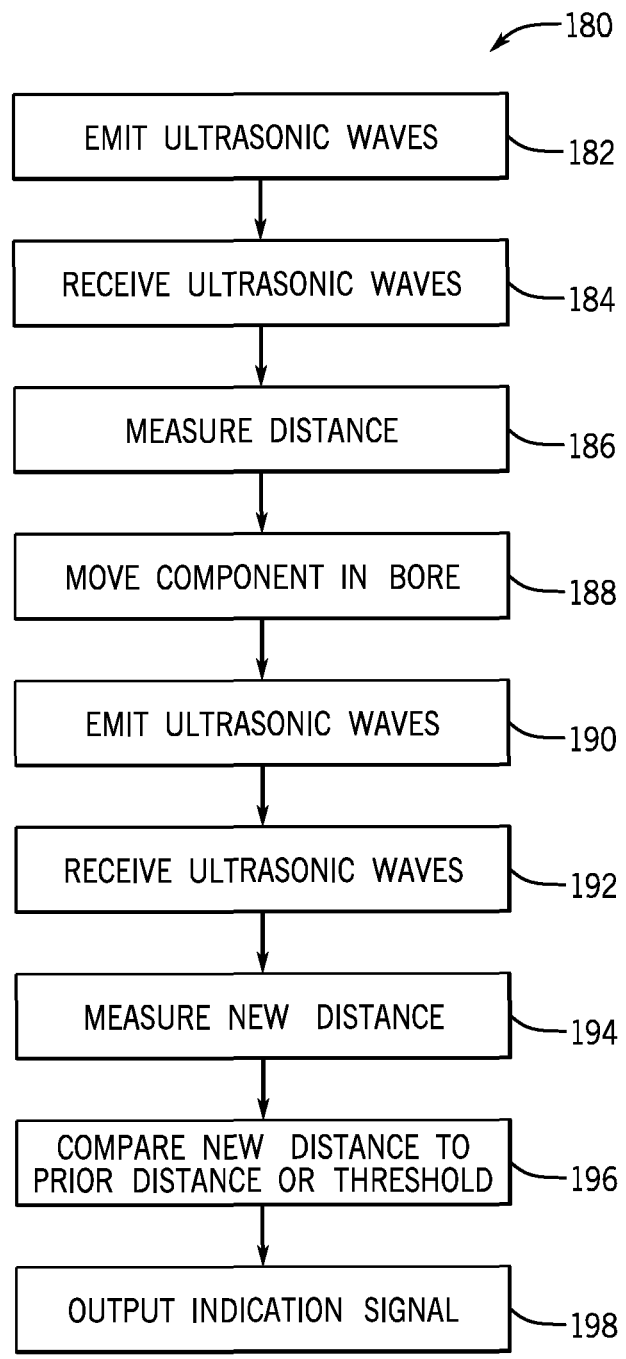
FIG. 14 is a flowchart representing a process for detecting location of a component within a bore at a desired position in accordance with one embodiment.

From the above description, it will be appreciated that some embodiments include processes for locating a component lowered into a wellhead assembly bore and, in more particular cases, detecting landing, locking, or concentricity of a component in the bore. FIG. 14 depicts a flowchart 180 representing a process for detecting movement of a component within a bore to a desired position in accordance with one embodiment. The process includes emitting and receiving ultrasonic waves (blocks 182 and 184) with one or more ultrasonic sensors. As described above, the emitted waves can be reflected off of an object lowered into the wellhead assembly bore (e.g., a hanger, packoff, or lockdown ring) and sensed to measure a distance (block 186) indicative of the location of the object, such as a distance between the object and the bore wall or between the object and an ultrasonic sensor.

After the component is further moved in the bore (block 188), ultrasonic waves can again be emitted and received (blocks 190 and 192) with the one or more ultrasonic sensors and a new distance indicative of the location of the object can be measured (block 194). The new distance can be compared (block 196) with the previous distance (e.g., to detect a difference between the measured distances corresponding to passage of a particular edge or surface of the object into or out of an ultrasonic beam) or with a threshold amount to detect landing or locking of an object within the bore. A threshold amount, for example, can represent a maximum (or minimum) width for a distance between the object and the bore wall (or sensor) at which the component will still be considered to be landed (e.g., in the case of a hanger or packoff) or locked (e.g., in the case of a lockdown ring). The measured distances can be used to confirm proper landing, locking, or concentricity of the object in the bore, as discussed above. Indication signals may be output (block 198) to inform a user about whether the internal bore objects are landed, locked, or concentric in the bore. In some embodiments, visual or audio indications are provided to a service technician to allow the technician to quickly verify proper landing, locking, and concentricity of objects within the wellhead assembly.

It should be understood that embodiments of the present disclosure may result in the following improved installation efficiency. For instance, installations may be faster and more reliable, unnecessary personnel can be removed and may not needed for equipment integrity, and real time equipment performance data can be provided in the field. It should be further understood that embodiments of the present disclosure may result in improved service quality performance. Unplanned downtime may be avoided, especially for remote well sites, better service confidence may result, and binary decision-making can be utilized, removing dependency on servicemen experience. Additionally, the present disclosure results may provide improved health, safety, and environment (HSE).

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded. In the claims, means-plus-function clauses are intended to cover the structures described herein as performing the recited function and not only structural equivalents, but also equivalent structures. It is the express intention of the applicant not to invoke 35 U.S.C. 112, paragraph 6 for any limitations of any of the claims herein, except for those in which the claim expressly uses the words "means for" together with an associated function.

What is claimed is:

1. A method of installing a hanger or a packoff at a target location within a wellhead, the wellhead having one or more ultrasonic sensors, the method comprising:
   lowering the hanger or the packoff within the wellhead;
   using the one or more ultrasonic sensors to detect when the hanger or the packoff is at the target location, comprising;
      emitting ultrasonic waves into a bore of a wellhead assembly including the wellhead from a first ultrasonic sensor of the one or more ultrasonic sensors; and
      sensing reflections of the ultrasonic waves from the hanger or the packoff;
   wherein the first ultrasonic sensor is axially offset from a landing shoulder in the bore, lowering the hanger or the packoff within the wellhead includes landing the hanger or the packoff on the landing shoulder, the target position is a position at which the hanger or the packoff is landed on the landing shoulder, and emitting ultrasonic waves into the bore from the first ultrasonic sensor includes emitting a beam of the ultrasonic waves from the first ultrasonic sensor into the bore at a location axially offset from the landing shoulder; and
   sensing passage of an edge of the hanger or the packoff past the location axially offset from the landing shoulder at which the beam of ultrasonic waves from the first ultrasonic sensor is emitted into the bore, and determining that the hanger or the packoff has landed on the landing shoulder based on the sensed passage of the edge of the hanger or the packoff.

2. The method of claim 1, wherein using the one or more ultrasonic sensors to detect when the hanger or the packoff is at the target location further includes:
   measuring a distance from the first ultrasonic sensor to the hanger or the packoff based on the sensed reflections; and
   outputting a signal indicating the hanger or the packoff is at the target location based on the measured distance from the first ultrasonic sensor to the hanger or the packoff.

3. The method of claim 1, wherein sensing passage of the edge of the hanger or the packoff past the location axially offset from the landing shoulder at which the beam of ultrasonic waves from the first ultrasonic sensor is emitted into the bore includes sensing passage of an upper end of the hanger or the packoff past the location axially offset from the landing shoulder at which the beam of ultrasonic waves from the first ultrasonic sensor is emitted into the bore.

4. The method of claim 1, wherein using the one or more ultrasonic sensors to detect when the hanger or the packoff is at the target location further includes:
   emitting ultrasonic waves into the bore from a second ultrasonic sensor of the one or more ultrasonic sensors;
   sensing reflections of the ultrasonic waves emitted by the first and second ultrasonic sensors;
   using each of the first ultrasonic sensor and the second ultrasonic sensor to independently detect that the hanger or the packoff is at the target location based on the sensed reflections of the ultrasonic waves; and
   based on the independent detection via each of the first ultrasonic sensor and the second ultrasonic sensor that the hanger or the packoff is at the target location, outputting a signal indicating that the hanger or the packoff is at the target location.

5. The method of claim 1, wherein sensing reflections of the ultrasonic waves from the hanger or the packoff includes sensing reflections of the ultrasonic waves from the hanger or the packoff with the first ultrasonic sensor.

6. The method of claim 1, comprising using the one or more ultrasonic sensors to detect concentricity of the hanger or the packoff in a bore of a wellhead assembly including the wellhead.

7. The method of claim 1, comprising using the one or more ultrasonic sensors to detect the position of a seal in a bore of a wellhead assembly including the wellhead.

8. The method of claim 1, wherein the target position is a landing position of the hanger or the packoff within the wellhead.

* * * * *